United States Patent [19]

Guest

[11] Patent Number: 5,429,396
[45] Date of Patent: Jul. 4, 1995

[54] SNAP-IN ASSEMBLIES AND RETAINING MEANS THEREFOR

[75] Inventor: Timothy S. Guest, Bray, United Kingdom

[73] Assignee: John Guest Engineering Limited, West Drayton, United Kingdom

[21] Appl. No.: 171,355

[22] Filed: Dec. 21, 1993

[30] Foreign Application Priority Data

Dec. 22, 1992 [GB] United Kingdom ............... 9226693

[51] Int. Cl.⁶ .................. F16L 39/00; F16L 37/088
[52] U.S. Cl. .................. 285/205; 403/155; 403/326; 411/517; 285/321
[58] Field of Search ............... 285/158, 201, 202, 203, 285/204, 205, 321, 921, 305; 403/154, 155, 326; 411/517, 530

[56] References Cited

U.S. PATENT DOCUMENTS

| | | | |
|---|---|---|---|
| Re. 32,846 | 1/1989 | Sandberg et al. | 411/517 |
| 738,503 | 9/1903 | Waters | 411/517 |
| 1,182,710 | 5/1916 | Rowell | 285/321 |
| 1,767,217 | 6/1930 | Kraft | 411/517 |
| 2,595,787 | 5/1952 | Heimann | 285/321 |
| 2,744,769 | 5/1956 | Roeder et al. | 411/517 |
| 2,886,355 | 5/1959 | Wurzel | 403/326 |
| 3,326,580 | 6/1967 | Munier et al. | 285/203 |
| 3,389,923 | 6/1968 | Love, Jr. et al. | 285/321 |
| 3,391,954 | 7/1968 | Callahan | 285/321 |
| 3,679,244 | 7/1972 | Reddy | 411/530 |
| 3,773,360 | 11/1973 | Timbers | 285/321 |
| 3,920,270 | 11/1975 | Babb, Jr. | 285/321 |
| 4,083,586 | 4/1978 | Helm | 285/321 |
| 4,247,147 | 1/1981 | Rettkowiki | 411/517 |
| 4,327,947 | 5/1982 | Bower, Jr. | 411/517 |
| 4,471,978 | 9/1984 | Kramer | 285/158 |
| 4,657,212 | 4/1987 | Gilmore | 285/205 |
| 4,828,423 | 5/1989 | Cramer, Jr. et al. | 403/326 |
| 5,022,687 | 6/1991 | Adriga | 285/321 |

FOREIGN PATENT DOCUMENTS

| | | | |
|---|---|---|---|
| 5865 | 12/1979 | European Pat. Off. | 285/321 |
| 2730611 | 8/1978 | Germany | 285/321 |

*Primary Examiner*—Eric K. Nicholson
*Attorney, Agent, or Firm*—Baker & Daniels

[57] ABSTRACT

The invention relates to a retainer in the form of a circlip for holding a connector or the like in a bore in a wall. The connector has a peripheral groove for receiving the circlip and the circlip has inwardly extending lugs at its free ends and an integral tongue on its inner periphery at an intermediate position around the circlip. The circlip also has three cam-like projections at its free ends and intermediate locations. A connector to be located in the bore in the wall is inserted through the bore with the circlip in place and the projections cause the circlip to be pressed into the groove in the connector as the circlip passes through the bore. Once through the bore, the circlip springs outwardly to engage behind the wall and retain the connector in place.

11 Claims, 2 Drawing Sheets

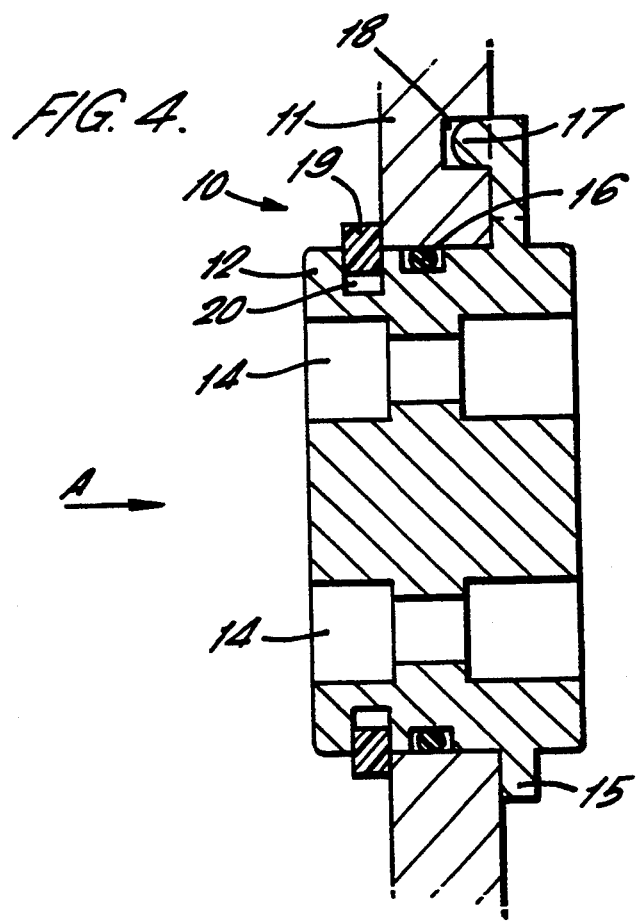
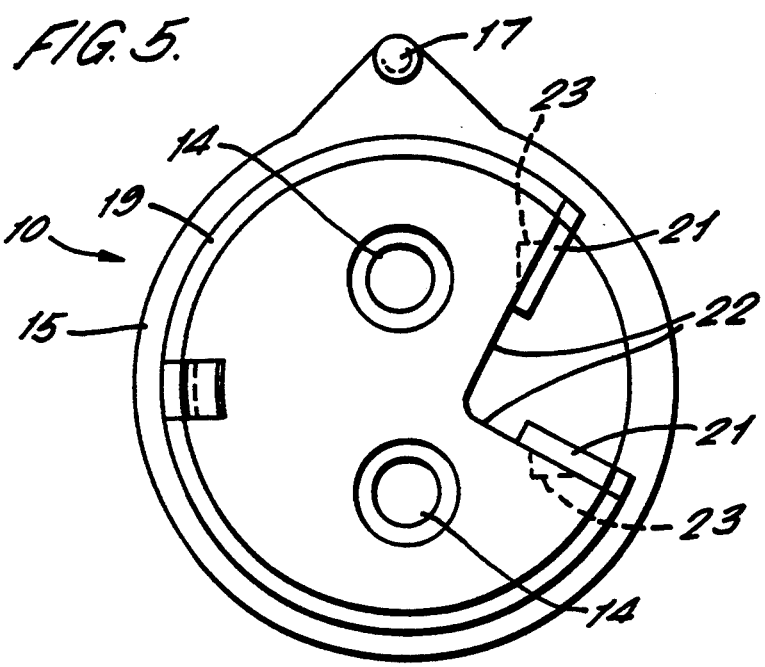

SNAP-IN ASSEMBLIES AND RETAINING MEANS THEREFOR

BACKGROUND TO THE INVENTION

1. Field of the Invention

This invention relates to snap-in assemblies and to retaining means therefor.

2. Background Prior Art

For holding an assembly in a bore in a member, a retaining circlip may be fitted into a peripheral groove in the assembly after the assembly is located in the bore. However, this may not be possible in some situations, for example when the assembly is to be fitted in an opening in the wall of a container or housing which does not provide or has restricted access to the area internally of the opening.

Many types of circlips also distort and tend to spread out when loaded.

SUMMARY OF THE INVENTION

According to the invention there is provided retaining means for holding an assembly in a bore in a member, the retaining means comprising a circlip for location in a peripheral groove in a body portion of the assembly in a rest position, wherein the circlip is provided with at least one cam like projection which on engagement with the wall of the bore causes the circlip to radially compress into the groove thereby allowing the circlip to pass through the bore, the circlip then returning to its rest position.

Preferably the circlip has at least three cam like projections spaced around its periphery, there being one projection at each end of the circlip and one or more projections intermediate the two ends.

It is also preferred that the or each cam like projection has an inwardly inclined face acting as a lead-in for the projection.

The circlip preferably has end lugs for locking engagement with the body portion whereby, in use, rotation of the circlip relative to the body portion is prevented.

Preferably each end lug has a projection for engagement in a detent in the body portion which acts to prevent the respective end lug from lifting when the circlip is under load.

The circlip is preferably provided with spring means for outwardly biasing the circlip into its rest position.

In the preferred embodiment of the invention the end lugs and the spring means together act, in use, to retain the circlip concentric with the body portion of the assembly.

The invention also provides an assembly for location in a bore in a member, the assembly comprising a body portion having a peripheral groove in which is fitted retaining means of the kind defined above, whereby, in use, the assembly is able to be located in the bore with a snap action manner and retained therein.

Preferably the assembly includes means, e.g. a locating stud, for preventing relative rotation between the assembly and the member when the assembly is located therein.

The assembly may be a pipe coupling.

Preferably the assembly is to be located in an opening in the wall of a container or housing which does not provide or in which there is restricted access to the area internally of the opening. For example, the assembly may be located in an opening in the top wall of a fuel tank.

BRIEF DESCRIPTION OF THE DRAWINGS

FIG. 4 is an axial section through a connector fitted with the circlip of FIG. 1 and located in a bore in a member; and FIG. 5 is an end view of the connector of FIG. 4 viewed in the direction of arrow A before the connector is located in the bore in the member.

DESCRIPTION OF THE PREFERRED EMBODIMENTS

Figure 1:
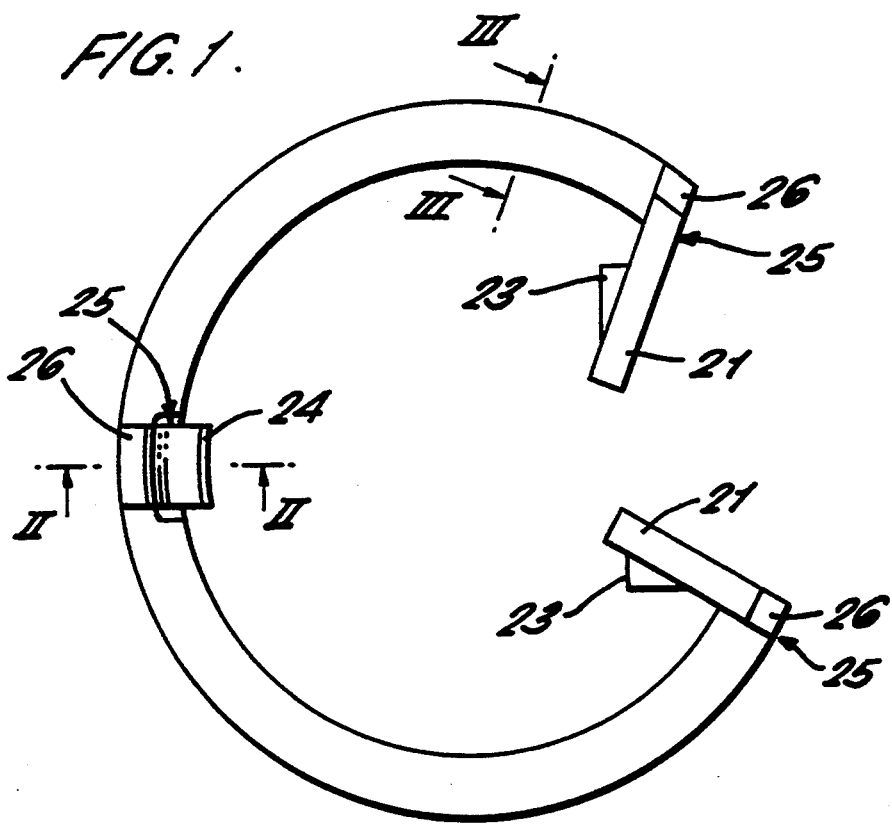
FIG. 1 is an elevation of a retaining circlip for holding an assembly in a bore in a member, which allows the assembly to be located in the bore with a snap action manner.
Figure 2:
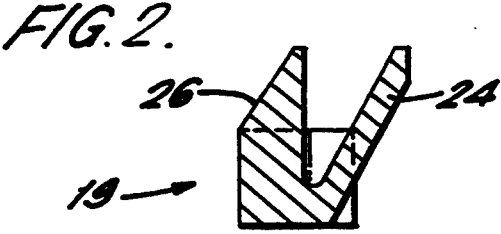
FIG. 2 is a section along line II—II in FIG. 1.
Figure 3:
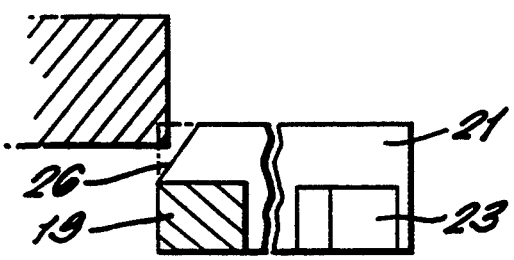
FIG. 3 is a section along line III—III in FIG. 1.

This example is concerned generally with a snap-in assembly which is located and retained in a bore in a member. The invention is not limited to any particular assembly but the assembly may be a connector or other fitting.

Referring to the drawings, there is shown a connector 10 retained in a bore in the wall 11 of a member by a circlip 19 which is fitted onto the connector, prior to the connector being located in the bore with a snap action manner. In this embodiment, the snap-in connector is a pipe coupling, but the connector may be of another form. The circlip is especially useful in a situation in which the connector is to be fitted in an opening in a container which does not provide or in which there is restricted access to the area internally of the opening. One example is when the connector is required to be fitted in an opening in the top wall of a fuel tank.

The connector 10 comprises a cylindrical body portion 12 including a pair of axially extending passages 14 into which pipe ends or their equivalent may be fitted. The particular form of pipe fitting is of no concern to the invention and need not be described. An O-ring 16 seals the connector in the bore in the wall 11. At the back end of the connector, the body portion 12 has a peripheral flange 15 for engagement with the external surface of the wall, and in this embodiment a locating stud 17 which engages in a blind hole 18 in the wall 11. The stud 17 orientates the connector 10 relative to the wall 11, and also prevents the connector from rotating relative to the wall 11 when the connector is located in the bore.

At the front end of the connector, the body portion 12 has a peripheral groove 20 in which is fitted a retaining circlip 19. The circlip is generally of rectangular or square cross-section and may conveniently be formed of plastics material or steel. In its expanded rest position within the groove 20, end lugs 21 of the circlip engage inwardly extending faces 22 of a notch in the body portion 12. The circlip 19 is thereby locked against rotation relative to the body portion 12. Each end lug 21 also has a projection 23 which engages a detent in the associated face 22 and prevents the respective end lug from lifting when the circlip is under end load. At an intermediate position substantially diametrically opposed to its ends 21 the circlip 19 has an integral tongue 24 pointing inwardly, when the circlip is fitted into the groove 20, for contact with the body portion and which acts as spring means to bias the circlip outwardly into its rest position. The end lugs 21 and the spring tongue 24 together act to retain the circlip concentric relative to the body portion 12.

The circlip 19 also has, at spaced intervals around its periphery, cam like projections 25 which lead in the direction of insertion of the connector 10 into the bore. On engagement of the projections 25 with the wall of the bore during insertion of the connector, the circlip is caused to radially compress into the groove 20 sufficiently to allow the circlip to pass through the bore. In this embodiment there are three cam like projections 25, two associated with the end lugs 21 respectively and the third at the circumferential position of the spring tongue 24. Also, in this embodiment, each projection has an inwardly inclined face 26 to act as a lead-in for the projection. Alternatively, each projection 25 may have a sharp entry point as indicated in dot-dash lines in FIG. 4, in which case the external end of the bore has an outwardly chamfered face to provide the lead-in.

In operation, the circlip 19 of FIG. 1 is fitted into the groove 20 of the body portion 12 of the connector 10. The end lugs 21, with their projections 23 engaging in the detents in the respective face 22, and the spring tongue 24 in engagement with the body portion 12, maintain the circlip in its rest position and concentric with the body portion. The three cam-like projections 25 extend in the direction of insertion of the connector. The connector 10 with the circlip 19 in situ is presented to the bore in the wall 11 and is located therein with a snap action manner. Engagement of the projections 25 with the wall of the bore causes the circlip 19 to be radially compressed into the groove 20 whilst it is passing through the bore. With the circlip axially beyond the inside of the wall 11, the spring tongue 24 acts to return the circlip to its initial rest position (FIG. 4). The connector 10 is then located in the bore in the wall 11 with the flange 15 on one side and the circlip 19 on the other side, and the circlip prevents the connector from being withdrawn.

One advantage of the circlip 19 described above is that it is located concentrically within the groove 20 both before and after fitting of the connector 10 in the wall 11. Since the circlip 19 is initially concentric and provided with the cam like projections 25, the connector 10 can be snap fitted simply by pushing the connector into the bore without tools and with the minimum of effort. Moreover, with the circlip 19 held concentric by the end lugs 21 and the spring tongue 24, after the connector is inserted into the bore, the maximum area of the circlip engages the internal surface of the wall 11, and this provides the maximum resistance to pull out load. In both situations the circlip is in its rest position and only lightly restrained. The circlip is therefore relatively unstressed. When under pull out load the end lugs 21 support the circlip from distorting outwardly and the projections 23 restrain the lugs from lifting.

The invention is not restricted to the specific details of the embodiment described above. For example, there may be a different number of cam like projections 25 and the projections may be located at other positions. Also, if desired, there may be only one projection 25 which could extend around the full circumference of the circlip.

Although the above embodiment is particularly concerned with the situation in which the area internally of the wall 11, for example of a container or housing, has restricted or no access from the outside, it will be appreciated that the circlip according to the invention may also be used in any other situation in which a snap-in assembly is required to be located in a bore in a member and retained therein.

I claim:

1. Retaining means for holding an assembly in a bore in a member, the retaining means comprising a circlip for location in a peripheral groove in a body portion of a said assembly in a rest position, said circlip comprising a generally planar interrupted circular ring having a gap separating the ends of the ring, the circlip including a cam like projection which on engagement with the wall of the said bore causes the circlip to collapse radially inwardly of the said groove in the plane of said ring to allow the circlip to pass through the said bore, the circlip then returning to its rest position, said circlip further including a plurality of end lugs for locking engagement with the said body portion whereby rotation of said circlip relative to the said body portion is prevented.

2. Retaining means as claimed in claim 1, wherein the circlip has at least three said cam like projections spaced around its periphery, there being one said projection at each end of the circlip and one or more said projections intermediate the two ends.

3. Retaining means as claimed in claim 1, wherein said cam like projection has an inwardly inclined face acting as a lead-in for the projection.

4. Retaining means as claimed in claim 1, wherein each end lug has a projection for engagement in a detent in the said body portion which acts to prevent the respective end lug from lifting when the circlip is under load.

5. Retaining means as claimed in claim 1, wherein the circlip is provided with spring means for outwardly biasing the circlip into its rest position.

6. Retaining means as claimed in claim 5, wherein the end lugs and the spring means together act, in use, to retain the said circlip concentric with the body portion of the said assembly.

7. An assembly for location in a bore in a member, the assembly comprising a body portion having a peripheral groove in which is fitted a retaining means, said retaining means comprising a circlip in the form of a generally planar interrupted circular ring with a gap separating the ends of the ring and having a cam like projection which, upon engagement with the wall of the said bore causes the circlip to collapse radially inwardly of the groove in the plane of said ring and allows the circlip to pass through the said bore, the circlip then returning to its rest position whereby, in use, the assembly is able to be located in the said bore with a snap action manner and retained therein, said circlip further comprising a plurality of end lugs for locking engagement with said body portion whereby rotation of said circlip relative to said body portion is prevented.

8. An assembly as claimed in claim 7, wherein the assembly includes means for preventing relative rotation between the assembly and the member when the assembly is located therein.

9. An assembly as claimed in claim 7, wherein the assembly is a pipe coupling.

10. An assembly as claimed in claim 7, wherein said member comprises a housing in which there is restricted access to the area internally of the bore.

11. An assembly as claimed in claim 10, wherein said member comprises the top wall of a fuel tank.

* * * * *